(12) United States Patent
Cox et al.

(10) Patent No.: US 7,931,463 B2
(45) Date of Patent: Apr. 26, 2011

(54) APPARATUS FOR POTTING MEMBRANES

(75) Inventors: David John Cox, Penrith (AU); Georg Schnieder, Bad Kreuznach (DE); Fufang Zha, Westmead (AU); Joachim Muller, Thornleigh (AU); Cinzia Lea, Winston Hills (AU)

(73) Assignee: Siemens Water Technologies Corp., Warrendale, PA (US)

( * ) Notice: Subject to any disclaimer, the term of this patent is extended or adjusted under 35 U.S.C. 154(b) by 203 days.

(21) Appl. No.: 11/197,969

(22) Filed: Aug. 5, 2005

(65) Prior Publication Data
US 2006/0110486 A1 May 25, 2006

Related U.S. Application Data

(60) Division of application No. 10/676,458, filed on Sep. 30, 2003, now Pat. No. 6,974,554, which is a continuation of application No. PCT/AU02/00436, filed on Apr. 4, 2002.

(30) Foreign Application Priority Data

Apr. 4, 2001 (AU) .................................. PR4215

(51) Int. Cl.
*B29C 39/08* (2006.01)
*B29C 39/10* (2006.01)

(52) U.S. Cl. ........ 425/501; 425/120; 425/123; 425/127; 425/130; 425/425

(58) Field of Classification Search .............. 425/501, 425/120, 123, 127, 130, 425
See application file for complete search history.

(56) References Cited

U.S. PATENT DOCUMENTS

| 256,008 A | 4/1882 | Leak |
| 285,321 A | 9/1883 | Tams |
| 1,997,074 A | 4/1935 | Novotny |
| 2,080,783 A | 5/1937 | Petersen |
| 2,105,700 A | 1/1938 | Ramage |
| 2,843,038 A | 7/1958 | Manspeaker |
| 2,926,086 A | 2/1960 | Chenicek et al. |
| 3,183,191 A | 5/1965 | Hach |
| 3,198,636 A | 8/1965 | Bouthilet |
| 3,228,876 A | 1/1966 | Mahon |

(Continued)

FOREIGN PATENT DOCUMENTS

AU 34400/84 9/1983

(Continued)

OTHER PUBLICATIONS

Webster's Ninth New Collegiate Dictionary, Merriam-Webster Inc., Publishers, Springfield, Massachusetts, USA, Copyright 1986, p. 1298.*

(Continued)

*Primary Examiner* — Matthew J Daniels
*Assistant Examiner* — Joseph Leyson

(57) ABSTRACT

An apparatus for potting membranes. The apparatus may include a mould for receiving ends of the membranes, means for forming a first layer of a curable resin material around the ends in the mould, and means for applying a second layer of a flexible resin material to the first layer prior to full curing of the first layer. The flexible resin material may be chemically reactive with the curable resin material to form an adhesive bond therebetween. A potting sleeve may be positioned within the mould. A centrifuge may receive the curable resin and/or the flexible resin material upstream of the mould.

12 Claims, 2 Drawing Sheets

U.S. PATENT DOCUMENTS

| | | | |
|---|---|---|---|
| 3,442,002 A | 5/1969 | Geary et al. | |
| 3,462,362 A | 8/1969 | Kollsman | |
| 3,492,698 A * | 2/1970 | Geary, Jr. et al. | 425/117 |
| 3,556,305 A | 1/1971 | Shorr | |
| 3,591,010 A | 7/1971 | Pall | |
| 3,625,827 A | 12/1971 | Wildi et al. | |
| 3,654,147 A | 4/1972 | Levin et al. | |
| 3,693,406 A | 9/1972 | Tobin | |
| 3,700,561 A | 10/1972 | Ziffer | |
| 3,708,071 A | 1/1973 | Crowley | |
| 3,728,256 A | 4/1973 | Cooper | |
| 3,763,055 A | 10/1973 | White et al. | |
| 3,791,631 A | 2/1974 | Meyer | |
| 3,804,258 A | 4/1974 | Okuniewski et al. | |
| 3,843,809 A | 10/1974 | Luck | |
| 3,876,738 A | 4/1975 | Marinaccio et al. | |
| 3,955,998 A | 5/1976 | Clampitt et al. | |
| 3,968,192 A | 7/1976 | Hoffman et al. | |
| 3,992,301 A | 11/1976 | Shippey et al. | |
| 3,993,816 A | 11/1976 | Baudet et al. | |
| 4,049,765 A | 9/1977 | Yamazaki | |
| 4,076,656 A | 2/1978 | White et al. | |
| 4,082,683 A | 4/1978 | Galesloot | |
| 4,105,731 A | 8/1978 | Yamazaki | |
| 4,107,043 A | 8/1978 | McKinney | |
| 4,138,460 A | 2/1979 | Tigner | |
| 4,183,890 A | 1/1980 | Bollinger | |
| 4,188,817 A | 2/1980 | Steigelmann | |
| 4,190,411 A * | 2/1980 | Fujimoto | 425/434 |
| 4,192,750 A | 3/1980 | Elfes et al. | |
| 4,193,780 A | 3/1980 | Cotton et al. | |
| 4,203,848 A | 5/1980 | Grandine, II | |
| 4,204,961 A | 5/1980 | Cusato, Jr. | |
| 4,218,324 A | 8/1980 | Hartmann et al. | |
| 4,226,921 A | 10/1980 | Tsang | |
| 4,227,295 A * | 10/1980 | Bodnar et al. | 29/527.3 |
| 4,230,583 A | 10/1980 | Chiolle et al. | |
| 4,247,498 A | 1/1981 | Castro | |
| 4,248,648 A | 2/1981 | Kopp | |
| 4,253,936 A | 3/1981 | Leysen et al. | |
| 4,271,026 A | 6/1981 | Chen et al. | |
| 4,302,336 A | 11/1981 | Kawaguchi et al. | |
| 4,340,479 A | 7/1982 | Pall | |
| 4,350,592 A | 9/1982 | Kronsbein | |
| 4,353,802 A | 10/1982 | Hara et al. | |
| 4,359,359 A | 11/1982 | Gerlach et al. | |
| 4,369,605 A | 1/1983 | Opersteny et al. | |
| 4,384,474 A | 5/1983 | Kowalski | |
| 4,385,150 A | 5/1983 | Miyake et al. | |
| 4,388,189 A | 6/1983 | Kawaguchi et al. | |
| 4,389,363 A | 6/1983 | Molthop | |
| 4,407,975 A | 10/1983 | Yamaguchi | |
| 4,414,113 A | 11/1983 | LaTerra | |
| 4,414,172 A | 11/1983 | Leason | |
| 4,431,545 A | 2/1984 | Pall et al. | |
| 4,451,369 A | 5/1984 | Sekino et al. | |
| 4,462,855 A * | 7/1984 | Yankowsky et al. | 156/307.3 |
| 4,476,112 A | 10/1984 | Aversano | |
| 4,491,522 A | 1/1985 | Ishida et al. | |
| 4,496,470 A | 1/1985 | Kapiloff et al. | |
| 4,511,471 A | 4/1985 | Müller | |
| 4,519,909 A | 5/1985 | Castro | |
| 4,540,490 A | 9/1985 | Shibata et al. | |
| 4,547,289 A | 10/1985 | Okano et al. | |
| 4,609,465 A | 9/1986 | Miller | |
| 4,610,789 A | 9/1986 | Barch | |
| 4,614,109 A | 9/1986 | Hofmann | |
| 4,623,670 A | 11/1986 | Mutoh et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis | |
| 4,656,865 A | 4/1987 | Callan | |
| 4,660,411 A | 4/1987 | Reid | |
| 4,666,543 A | 5/1987 | Kawano | |
| 4,670,145 A | 6/1987 | Edwards | |
| 4,673,507 A | 6/1987 | Brown | |
| 4,687,561 A | 8/1987 | Kunz | |
| 4,687,578 A | 8/1987 | Stookey | |
| 4,688,511 A | 8/1987 | Gerlach et al. | |
| 4,689,191 A | 8/1987 | Beck et al. | |
| 4,702,836 A | 10/1987 | Mutoh et al. | |
| 4,702,840 A | 10/1987 | Degen et al. | |
| 4,707,266 A | 11/1987 | Degen et al. | |
| 4,708,799 A | 11/1987 | Gerlach et al. | |
| 4,718,270 A | 1/1988 | Storr | |
| 4,744,240 A | 5/1988 | Reichelt | |
| 4,749,487 A | 6/1988 | Lefebvre | |
| 4,756,875 A | 7/1988 | Tajima et al. | |
| 4,763,612 A | 8/1988 | Iwanami | |
| 4,767,539 A | 8/1988 | Ford | |
| 4,774,132 A | 9/1988 | Joffee et al. | |
| 4,775,471 A | 10/1988 | Nagai et al. | |
| 4,779,448 A | 10/1988 | Gogins | |
| 4,781,831 A | 11/1988 | Goldsmith | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,824,563 A | 4/1989 | Iwahori et al. | |
| 4,834,998 A | 5/1989 | Shrikhande | |
| 4,839,048 A | 6/1989 | Reed et al. | |
| 4,840,227 A | 6/1989 | Schmidt | |
| 4,846,970 A | 7/1989 | Bertelsen et al. | |
| 4,867,883 A | 9/1989 | Daigger et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,919,815 A | 4/1990 | Copa et al. | |
| 4,921,610 A | 5/1990 | Ford et al. | |
| 4,931,186 A | 6/1990 | Ford et al. | |
| 4,933,084 A | 6/1990 | Bandel et al. | |
| 4,935,143 A | 6/1990 | Kopp et al. | |
| 4,963,304 A | 10/1990 | Im et al. | |
| 4,968,430 A | 11/1990 | Hildenbrand et al. | |
| 4,968,733 A | 11/1990 | Muller et al. | |
| 4,969,997 A | 11/1990 | Klüver et al. | |
| 4,988,444 A | 1/1991 | Applegate et al. | |
| 4,999,038 A | 3/1991 | Lundberg | |
| 5,005,430 A | 4/1991 | Kibler et al. | |
| 5,015,275 A | 5/1991 | Beck et al. | |
| 5,024,762 A | 6/1991 | Ford et al. | |
| 5,034,125 A | 7/1991 | Karbachsch et al. | |
| 5,043,113 A | 8/1991 | Kafchinski et al. | |
| 5,059,317 A | 10/1991 | Marius et al. | |
| 5,066,375 A | 11/1991 | Parsi et al. | |
| 5,066,401 A | 11/1991 | Muller et al. | |
| 5,066,402 A | 11/1991 | Anselme et al. | |
| 5,069,065 A | 12/1991 | Sprunt et al. | |
| 5,069,353 A * | 12/1991 | Espenan | 220/4.01 |
| 5,075,065 A | 12/1991 | Effenberger et al. | |
| 5,076,925 A | 12/1991 | Roesink et al. | |
| 5,079,272 A | 1/1992 | Allegrezza et al. | |
| 5,094,750 A | 3/1992 | Kopp et al. | |
| 5,094,867 A | 3/1992 | Detering et al. | |
| 5,098,567 A | 3/1992 | Nishiguchi | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,158,721 A | 10/1992 | Allegrezza et al. | |
| 5,169,528 A | 12/1992 | Karbachsch et al. | |
| 5,182,019 A | 1/1993 | Cote et al. | |
| 5,192,442 A | 3/1993 | Piccirillo et al. | |
| 5,192,456 A | 3/1993 | Ishida et al. | |

| | | | | | | |
|---|---|---|---|---|---|---|
| 5,192,478 A | 3/1993 | Caskey | | 5,958,243 A | 9/1999 | Lawrence et al. |
| 5,194,149 A | 3/1993 | Selbie et al. | | 5,968,357 A | 10/1999 | Doelle et al. |
| 5,198,116 A | 3/1993 | Comstock et al. | | 5,988,400 A | 11/1999 | Karachevtcev et al. |
| 5,198,162 A | 3/1993 | Park et al. | | 5,997,745 A | 12/1999 | Tonelli et al. |
| 5,209,852 A | 5/1993 | Sunaoka et al. | | 6,017,451 A | 1/2000 | Kopf |
| 5,211,823 A | 5/1993 | Giuffrida et al. | | 6,024,872 A | 2/2000 | Mahendran |
| 5,221,478 A | 6/1993 | Dhingra et al. | | 6,036,030 A | 3/2000 | Stone et al. |
| 5,227,063 A | 7/1993 | Langerak et al. | | 6,039,872 A | 3/2000 | Wu et al. |
| 5,248,424 A | 9/1993 | Cote et al. | | 6,042,677 A | 3/2000 | Mahendran et al. |
| 5,262,054 A | 11/1993 | Wheeler | | 6,045,698 A | 4/2000 | Côté et al. |
| 5,271,830 A | 12/1993 | Faivre et al. | | 6,045,899 A | 4/2000 | Wang et al. |
| 5,275,766 A | 1/1994 | Gadkaree et al. | | 6,048,454 A | 4/2000 | Jenkins |
| 5,286,324 A | 2/1994 | Kawai et al. | | 6,048,455 A | 4/2000 | Janik |
| 5,290,457 A | 3/1994 | Karbachsch et al. | | 6,066,401 A | 5/2000 | Stilburn |
| 5,297,420 A | 3/1994 | Gilliland et al. | | 6,074,718 A | 6/2000 | Puglia et al. |
| 5,316,671 A | 5/1994 | Murphy | | 6,077,435 A | 6/2000 | Beck et al. |
| 5,320,760 A | 6/1994 | Freund et al. | | 6,083,393 A | 7/2000 | Wu et al. |
| 5,353,630 A | 10/1994 | Soda et al. | | 6,096,213 A | 8/2000 | Radovanovic et al. |
| 5,358,732 A | 10/1994 | Seifter et al. | | 6,113,782 A | 9/2000 | Leonard |
| 5,361,625 A | 11/1994 | Ylvisaker | | 6,120,688 A | 9/2000 | Daly et al. |
| 5,364,527 A | 11/1994 | Zimmermann et al. | | 6,126,819 A | 10/2000 | Heine et al. |
| 5,364,529 A | 11/1994 | Morin et al. | | 6,146,747 A | 11/2000 | Wang et al. |
| 5,374,353 A | 12/1994 | Murphy | | 6,149,817 A | 11/2000 | Peterson et al. |
| 5,389,260 A | 2/1995 | Hemp | | 6,156,200 A | 12/2000 | Zha et al. |
| 5,393,433 A | 2/1995 | Espenan et al. | | 6,159,373 A | 12/2000 | Beck et al. |
| 5,396,019 A | 3/1995 | Sartori et al. | | 6,193,890 B1 | 2/2001 | Pederson et al. |
| 5,401,401 A | 3/1995 | Hickok | | 6,202,475 B1 | 3/2001 | Selbie et al. |
| 5,401,405 A | 3/1995 | McDougald | | 6,214,231 B1 | 4/2001 | Cote et al. |
| 5,403,479 A | 4/1995 | Smith et al. | | 6,214,232 B1 | 4/2001 | Baurmeister et al. |
| 5,405,528 A | 4/1995 | Selbie et al. | | 6,221,247 B1 | 4/2001 | Nemser et al. |
| 5,411,663 A | 5/1995 | Johnson | | 6,245,239 B1 | 6/2001 | Cote et al. |
| 5,417,101 A | 5/1995 | Weich | | 6,254,773 B1 | 7/2001 | Biltoft |
| 5,419,816 A | 5/1995 | Sampson et al. | | 6,264,839 B1 | 7/2001 | Mohr et al. |
| 5,451,317 A | 9/1995 | Ishida et al. | | 6,277,512 B1 | 8/2001 | Hamrock et al. |
| 5,468,397 A | 11/1995 | Barboza et al. | | 6,280,626 B1 | 8/2001 | Miyashita et al. |
| 5,470,469 A | 11/1995 | Eckman | | 6,284,135 B1 | 9/2001 | Ookata |
| 5,477,731 A | 12/1995 | Mouton | | 6,290,756 B1 * | 9/2001 | Macheras et al. .................. 96/8 |
| 5,479,590 A | 12/1995 | Lin | | 6,294,039 B1 | 9/2001 | Mahendran et al. |
| 5,480,553 A | 1/1996 | Yamamori et al. | | 6,299,773 B1 | 10/2001 | Takamura et al. |
| 5,484,528 A | 1/1996 | Yagi et al. | | 6,303,026 B1 | 10/2001 | Lindbo |
| 5,490,939 A | 2/1996 | Gerigk et al. | | 6,303,035 B1 | 10/2001 | Cote et al. |
| 5,491,023 A | 2/1996 | Tsai et al. | | 6,315,895 B1 | 11/2001 | Summerton et al. |
| 5,501,798 A | 3/1996 | Al-Samadi et al. | | 6,322,703 B1 | 11/2001 | Taniguchi et al. |
| 5,525,220 A | 6/1996 | Yagi et al. | | 6,325,928 B1 | 12/2001 | Pedersen et al. |
| 5,531,848 A | 7/1996 | Brinda et al. | | 6,337,018 B1 | 1/2002 | Mickols |
| 5,531,900 A | 7/1996 | Raghaven et al. | | RE37,549 E | 2/2002 | Mahendran et al. |
| 5,543,002 A | 8/1996 | Brinda et al. | | 6,354,444 B1 | 3/2002 | Mahendran |
| 5,552,047 A | 9/1996 | Oshida et al. | | 6,361,695 B1 | 3/2002 | Husain et al. |
| 5,554,283 A | 9/1996 | Brinda et al. | | 6,368,819 B1 | 4/2002 | Gaddy et al. |
| 5,556,591 A | 9/1996 | Jallerat et al. | | 6,375,848 B1 | 4/2002 | Cote et al. |
| 5,575,963 A | 11/1996 | Soffer et al. | | 6,387,189 B1 | 5/2002 | Gröschl et al. |
| 5,597,732 A | 1/1997 | Bryan-Brown | | 6,402,955 B2 | 6/2002 | Ookata |
| 5,607,593 A | 3/1997 | Cote et al. | | 6,406,629 B1 | 6/2002 | Husain et al. |
| 5,639,373 A | 6/1997 | Mahendran et al. | | 6,423,214 B1 | 7/2002 | Lindbo |
| 5,643,455 A | 7/1997 | Kopp et al. | | 6,423,784 B1 | 7/2002 | Hamrock et al. |
| 5,647,988 A | 7/1997 | Kawanishi et al. | | 6,432,310 B1 | 8/2002 | Andou et al. |
| 5,670,053 A | 9/1997 | Collentro et al. | | 6,440,303 B2 | 8/2002 | Spriegel |
| 5,677,360 A | 10/1997 | Yamamori et al. | | D462,699 S | 9/2002 | Johnson et al. |
| 5,688,460 A | 11/1997 | Ruschke | | 6,444,124 B1 | 9/2002 | Onyeche et al. |
| 5,733,456 A | 3/1998 | Okey et al. | | 6,468,430 B1 | 10/2002 | Kimura et al. |
| 5,744,037 A | 4/1998 | Fujimura et al. | | 6,485,645 B1 | 11/2002 | Husain et al. |
| 5,747,605 A | 5/1998 | Breant et al. | | 6,495,041 B2 | 12/2002 | Taniguchi et al. |
| 5,766,479 A | 6/1998 | Collentro et al. | | 6,524,481 B2 | 2/2003 | Zha et al. |
| D396,046 S | 7/1998 | Scheel et al. | | 6,524,733 B1 | 2/2003 | Nonobe |
| 5,783,083 A | 7/1998 | Henshaw et al. | | 6,550,747 B2 | 4/2003 | Rabie et al. |
| D396,726 S | 8/1998 | Sadr et al. | | 6,555,005 B1 | 4/2003 | Zha et al. |
| D400,890 S | 11/1998 | Gambardella | | 6,576,136 B1 | 6/2003 | De Moel et al. |
| 5,843,069 A | 12/1998 | Butler et al. | | D478,913 S | 8/2003 | Johnson et al. |
| 5,846,424 A | 12/1998 | Khudenko | | 6,620,319 B2 | 9/2003 | Behmann et al. |
| 5,888,401 A | 3/1999 | Nguyen | | 6,627,082 B2 | 9/2003 | Del Vecchio |
| 5,895,570 A | 4/1999 | Liang | | 6,635,179 B1 | 10/2003 | Summerton et al. |
| 5,906,739 A | 5/1999 | Osterland et al. | | 6,641,733 B2 | 11/2003 | Zha et al. |
| 5,906,742 A | 5/1999 | Wang et al. | | 6,645,374 B2 | 11/2003 | Cote et al. |
| 5,910,250 A | 6/1999 | Mahendran et al. | | 6,656,356 B2 | 12/2003 | Gungerich et al. |
| 5,914,039 A | 6/1999 | Mahendran | | 6,682,652 B2 | 1/2004 | Mahendran et al. |
| 5,918,264 A | 6/1999 | Drummond et al. | | 6,685,832 B2 | 2/2004 | Mahendran et al. |
| 5,942,113 A | 8/1999 | Morimura | | 6,696,465 B2 | 2/2004 | Dellaria et al. |
| 5,944,997 A | 8/1999 | Pedersen et al. | | 6,702,561 B2 | 3/2004 | Stillig et al. |
| 5,951,878 A | 9/1999 | Astrom | | 6,706,189 B2 | 3/2004 | Rabie et al. |

| | | |
|---|---|---|
| 6,708,957 B2 | 3/2004 | Cote et al. |
| 6,721,529 B2 | 4/2004 | Chen et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,758,972 B2 | 7/2004 | Vriens et al. |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,811,696 B2 | 11/2004 | Wang et al. |
| 6,814,861 B2 | 11/2004 | Husain et al. |
| 6,821,420 B2 | 11/2004 | Zha et al. |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,823 B2 | 3/2005 | Côté |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 * | 2/2006 | Lowell .................. 264/263 |
| 7,018,530 B2 | 3/2006 | Pollock |
| 7,018,533 B2 | 3/2006 | Johnson et al. |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,701 B2 | 2/2007 | Gaid et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,300,022 B2 | 11/2007 | Muller |
| 2002/0070157 A1 | 6/2002 | Yamada |
| 2002/0148767 A1 | 10/2002 | Johnson et al. |
| 2002/0153299 A1 | 10/2002 | Mahendran et al. |
| 2002/0153313 A1 | 10/2002 | Cote |
| 2002/0195390 A1 | 12/2002 | Zha et al. |
| 2003/0038080 A1 | 2/2003 | Vriens et al. |
| 2003/0057155 A1 | 3/2003 | Husain et al. |
| 2003/0075504 A1 | 4/2003 | Zha et al. |
| 2003/0089659 A1 | 5/2003 | Zha et al. |
| 2003/0127388 A1 | 7/2003 | Ando et al. |
| 2003/0136746 A1 | 7/2003 | Behmann et al. |
| 2003/0146153 A1 | 8/2003 | Cote et al. |
| 2003/0150807 A1 | 8/2003 | Bartels et al. |
| 2003/0178365 A1 | 9/2003 | Zha et al. |
| 2003/0226797 A1 | 12/2003 | Phelps |
| 2004/0007525 A1 | 1/2004 | Rabie et al. |
| 2004/0035770 A1 | 2/2004 | Edwards et al. |
| 2004/0084369 A1 | 5/2004 | Zha et al. |
| 2004/0145076 A1 | 7/2004 | Zha et al. |
| 2004/0168979 A1 | 9/2004 | Zha et al. |
| 2004/0173525 A1 | 9/2004 | Hunniford et al. |
| 2004/0178154 A1 | 9/2004 | Zha et al. |
| 2004/0217053 A1 | 11/2004 | Zha et al. |
| 2004/0232076 A1 | 11/2004 | Zha et al. |
| 2005/0029185 A1 | 2/2005 | Muller |
| 2005/0029186 A1 | 2/2005 | Muller |
| 2005/0032982 A1 | 2/2005 | Muller et al. |
| 2005/0061725 A1 | 3/2005 | Liu et al. |
| 2005/0103722 A1 | 5/2005 | Freydina et al. |
| 2005/0115880 A1 | 6/2005 | Pollock |
| 2005/0115899 A1 | 6/2005 | Liu et al. |
| 2005/0139538 A1 | 6/2005 | Lazaredes |
| 2005/0194310 A1 | 9/2005 | Yamamoto et al. |
| 2005/0194315 A1 | 9/2005 | Adams et al. |
| 2006/0000775 A1 | 1/2006 | Zha et al. |
| 2006/0131234 A1 | 6/2006 | Zha et al. |
| 2006/0201876 A1 | 9/2006 | Jordan |
| 2006/0261007 A1 | 11/2006 | Zha et al. |
| 2006/0273038 A1 | 12/2006 | Syed et al. |
| 2007/0007214 A1 | 1/2007 | Zha et al. |
| 2007/0056905 A1 | 3/2007 | Beck et al. |
| 2007/0075021 A1 | 4/2007 | Johnson |
| 2007/0108125 A1 | 5/2007 | Cho et al. |
| 2007/0227973 A1 | 10/2007 | Zha et al. |

FOREIGN PATENT DOCUMENTS

| | | |
|---|---|---|
| AU | 55847/86 | 3/1985 |
| AU | 77066/87 | 7/1986 |
| CN | 1050770 C | 1/1995 |
| DE | 3904544 A1 | 8/1990 |
| DE | 4113420 A1 | 10/1992 |
| DE | 4 117 422 | 11/1992 |
| DE | 4117422 C1 | 11/1992 |
| DE | 29804927 U1 | 6/1998 |
| DE | 29906389 | 6/1999 |
| EP | 012557 B1 | 2/1983 |
| EP | 126714 A2 | 11/1984 |
| EP | 050447 B1 | 10/1985 |
| EP | 250337 A1 | 12/1987 |
| EP | 327025 A1 | 8/1989 |
| EP | 090383 B1 | 5/1990 |
| EP | 407900 A2 | 1/1991 |
| EP | 463627 A2 | 1/1992 |
| EP | 492942 A2 | 7/1992 |
| EP | 518250 B1 | 12/1992 |
| EP | 547575 A1 | 6/1993 |
| EP | 395133 B1 | 2/1995 |
| EP | 0 463 627 B1 | 5/1995 |
| EP | 662341 A1 | 7/1995 |
| EP | 492446 B1 | 11/1995 |
| EP | 430082 B1 | 6/1996 |
| EP | 0 763 758 A1 | 10/1996 |
| EP | 734758 A1 | 10/1996 |
| EP | 763758 A1 | 3/1997 |
| EP | 824956 A2 | 2/1998 |
| EP | 855214 A1 | 7/1998 |
| EP | 627255 B1 | 1/1999 |
| EP | 911073 A1 | 4/1999 |
| EP | 1034835 A | 9/2000 |
| EP | 1 052 012 A1 | 11/2000 |
| EP | 920 904 A1 | 12/2000 |
| EP | 1349644 | 10/2003 |
| EP | 1350555 A1 | 10/2003 |
| EP | 1236503 B1 | 8/2004 |
| FR | 2620712 | 3/1989 |
| FR | 2 674 448 A1 | 2/1992 |
| FR | 2 699 424 * | 6/1994 |
| GB | 702911 | 1/1954 |
| GB | 2 253 572 A | 9/1992 |
| JP | 54-162684 | 12/1979 |
| JP | 55-129155 | 6/1980 |
| JP | 55-099703 | 7/1980 |
| JP | 55-129107 | 10/1980 |
| JP | 56-021604 | 2/1981 |
| JP | 56-118701 | 9/1981 |
| JP | 56-121685 | 9/1981 |
| JP | 58-088007 | 5/1983 |
| JP | 60-109002 | 1/1985 |
| JP | 60-206412 | 10/1985 |
| JP | 61171504 A | 2/1986 |
| JP | 61222510 A | 3/1986 |
| JP | 61-097005 | 5/1986 |
| JP | 61-097006 | 5/1986 |
| JP | 61-107905 | 5/1986 |
| JP | 61-192309 | 8/1986 |
| JP | 61-242607 | 10/1986 |
| JP | 61-249505 | 11/1986 |
| JP | 61-257203 | 11/1986 |

| JP | 61-263605 | 11/1986 |
| JP | 61-291007 | 12/1986 |
| JP | 61-293504 | 12/1986 |
| JP | 62-004408 | 1/1987 |
| JP | 62-114609 | 5/1987 |
| JP | 62-140607 | 6/1987 |
| JP | 62-144708 | 6/1987 |
| JP | 62-163708 | 7/1987 |
| JP | 62-179540 | 8/1987 |
| JP | 62-250908 | 10/1987 |
| JP | 63-097634 | 4/1988 |
| JP | 63-143905 | 6/1988 |
| JP | 63-180254 | 7/1988 |
| JP | S63-38884 | 10/1988 |
| JP | 01-151906 | 6/1989 |
| JP | 01-307409 | 12/1989 |
| JP | 02-026625 | 1/1990 |
| JP | 02-031200 | 2/1990 |
| JP | 02-107318 | 4/1990 |
| JP | 02-126922 | 5/1990 |
| JP | 02-144132 | 6/1990 |
| JP | 02-164423 | 6/1990 |
| JP | 2-241523 * | 9/1990 |
| JP | 02-277528 | 11/1990 |
| JP | 02-284035 | 11/1990 |
| JP | 03-018373 | 1/1991 |
| JP | 03-028797 | 2/1991 |
| JP | 03-110445 | 5/1991 |
| JP | 31-010445 | 5/1991 |
| JP | 04-187224 | 7/1992 |
| JP | 04-250898 | 9/1992 |
| JP | 04-256424 | 9/1992 |
| JP | 04-265128 | 9/1992 |
| JP | 04-293527 | 10/1992 |
| JP | 04-310223 | 11/1992 |
| JP | 04-334530 | 11/1992 |
| JP | 04-348252 | 12/1992 |
| JP | 05-023557 | 2/1993 |
| JP | 05-096136 | 4/1993 |
| JP | 05-137977 | 6/1993 |
| JP | 05-157654 | 6/1993 |
| JP | 05-285348 | 11/1993 |
| JP | 06-071120 | 3/1994 |
| JP | 06-114240 | 4/1994 |
| JP | 06-218237 | 8/1994 |
| JP | 06-277469 | 10/1994 |
| JP | 06-285496 | 10/1994 |
| JP | 06-343837 | 12/1994 |
| JP | 07-000770 | 1/1995 |
| JP | 07-024272 | 1/1995 |
| JP | 07-068139 | 3/1995 |
| JP | 07-136470 | 5/1995 |
| JP | 07-136471 | 5/1995 |
| JP | 07-155758 | 6/1995 |
| JP | 07-178323 | 7/1995 |
| JP | 07-185268 | 7/1995 |
| JP | 07-185271 | 7/1995 |
| JP | 07-236819 | 9/1995 |
| JP | 07-251043 | 10/1995 |
| JP | 07-275665 | 10/1995 |
| JP | 07-289860 | 11/1995 |
| JP | 07-303895 | 11/1995 |
| JP | 08-010585 | 1/1996 |
| JP | 09-072993 | 3/1997 |
| JP | 09-099227 | 4/1997 |
| JP | 09-141063 | 6/1997 |
| JP | 09-187628 | 7/1997 |
| JP | 09-220569 | 8/1997 |
| JP | 09-271641 | 10/1997 |
| JP | 09-324067 | 12/1997 |
| JP | 10-033955 | 2/1998 |
| JP | 10048466 A | 2/1998 |
| JP | 10-085565 | 4/1998 |
| JP | 10-156149 | 6/1998 |
| JP | 63171607 A | 7/1998 |
| JP | 11-028467 | 2/1999 |
| JP | 11-156166 | 6/1999 |
| JP | 11-165200 | 6/1999 |
| JP | 11-333265 | 7/1999 |
| JP | 11033365 A | 9/1999 |
| JP | 11-319507 | 11/1999 |
| JP | 2000-070684 | 3/2000 |
| JP | 2000-185220 | 4/2000 |
| JP | 2000-157850 | 6/2000 |
| JP | 2000-317276 | 11/2000 |
| JP | 2000342932 A | 12/2000 |
| JP | 2001-009246 | 1/2001 |
| JP | 2001-070967 | 3/2001 |
| JP | 2001-079367 | 3/2001 |
| JP | 2001-104760 | 4/2001 |
| JP | 2001-190937 | 7/2001 |
| JP | 2001-190938 | 7/2001 |
| JP | 2001-205055 | 7/2001 |
| JP | 2003-047830 | 2/2003 |
| JP | 2003-062436 | 3/2003 |
| JP | 2003-135935 | 5/2003 |
| JP | 61167406 A | 7/2006 |
| KR | 202-0090967 | 12/2002 |
| NL | 1020491 C | 10/2003 |
| NL | 1021197 C | 10/2003 |
| TW | 347343 | 12/1998 |
| WO | WO 88/00494 * | 1/1988 |
| WO | WO 88-06200 | 8/1988 |
| WO | WO 89-00880 | 2/1989 |
| WO | WO 90/00434 | 1/1990 |
| WO | WO 91-04783 | 4/1991 |
| WO | WO 91-16124 | 10/1991 |
| WO | WO 93-02779 | 2/1993 |
| WO | WO 93-15827 | 8/1993 |
| WO | WO 93-23152 | 11/1993 |
| WO | WO 94-11094 | 5/1994 |
| WO | WO 95-34424 | 12/1995 |
| WO | WO 96-07470 A1 | 3/1996 |
| WO | WO 96-28236 | 9/1996 |
| WO | WO 96/41676 | 12/1996 |
| WO | WO 97-06880 | 2/1997 |
| WO | WO 98-22204 | 5/1998 |
| WO | WO 98-25694 | 6/1998 |
| WO | WO 98-28066 | 7/1998 |
| WO | WO 98-53902 | 12/1998 |
| WO | WO 99-01207 | 1/1999 |
| WO | WO 99-59707 | 11/1999 |
| WO | WO 00-18498 | 4/2000 |
| WO | WO 00-30742 | 6/2000 |
| WO | WO 01-00307 | 1/2001 |
| WO | WO 01-32299 | 5/2001 |
| WO | WO 01-36075 | 5/2001 |
| WO | WO 01-45829 A1 | 6/2001 |
| WO | WO 02-40140 A1 | 5/2002 |
| WO | WO 03-000389 A2 | 1/2003 |
| WO | WO 03-013706 A1 | 2/2003 |
| WO | WO 2004-101120 A1 | 11/2004 |
| WO | WO 2005-021140 A1 | 3/2005 |
| WO | WO 2005-037414 A1 | 4/2005 |
| WO | WO 2005-077499 A1 | 8/2005 |
| WO | WO 2006-029456 A1 | 3/2006 |

OTHER PUBLICATIONS

English translation of JP 11033365, Aug. 2009.*
U.S. Appl. No. 10/298,471, filed Nov. 15, 2002, Gallagher et al.
U.S. Appl. No. 10/369,813, filed Feb. 18, 2003, Zha et al.
U.S. Appl. No. 10/406,807, filed Apr. 2, 2003, Johnson et al.
U.S. Appl. No. 10/423,044, filed Apr. 23, 2003, Phelps.
U.S. Appl. No. 10/428,601, filed May 1, 2003, Zha et al.
U.S. Appl. No. 10/437,202, filed May 12, 2003, Muller.
U.S. Appl. No. 29/119,130, filed Feb. 24, 2000, Johnson et al.
Derwent Abstract Accession No. 2001-142268/15, J01 JP, A1, 2000342932 (Mitsubishi Rayon Co. Ltd.), Dec. 12, 2000.
International Search Report in Corresponding PCT Application No. PCT/AU02/00436.
Almulla et al., Desalination 153 (2002) 237-243.
Rosenberger et al., Desalination 151 (2002) 195-200.
Almulla et al., Desalination, 153 (2002), pp. 237-243.
Anonymous, "*Nonwoven Constructions of Dyneon ™ THV and Dyneon ™ THE Fluorothermoplastics*", Research Disclosure Journal, Apr. 1999, RD 420013, 2 pages.

Cote et al., *Wat. Sci. Tech.* 38(4-5) (1998), pp. 437-442.

Cote, et al. "A New Immersed Membrane for Pretreatment to Reverse Osmosis" Desalination 139 (2001) 229-236.

Crawford et al., "Procurement of Membrane Equipment: Differences Between Water Treatment and Membrane Bioreactor (MBR) Applications" (2003).

Davis et al., Membrane Technology Conference, "Membrane Bioreactor Evaluation for Water Reuse in Seattle, Washington" (2003).

DeCarolis et al., Membrane Technology Conference, "Optimization of Various MBR Systems for Water Reclamation" (2003).

Dow Chemicals Company, "Filmtec Membranes—Cleaning Procedures for Filmtec FT30 Elements," Tech Facts, Online, Jun. 30, 2000, XP002237568.

Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.

Johnson, "Recent Advances in Microfiltration for Drinking Water Treatment," AWWA Annual Conference, Jun. 20-24, 1999, Chicago, Illinois, entire publication.

Recent Advances in Microfiltration for Drinking Water Treatment; An Introduction to CMF-S, Presentation.

Kaiya et al., "Water Purification Using Hollow Fiber Microfiltration Membranes," 6th World Filtration Congress, Nagoya, 1993, pp. 813-816.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

MicroC™ -Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. 1, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

*Water Encyclopedia*, edited by Jay Lehr, published by John Wiley & Sons, Inc., Hoboken, New Jersey, 2005. Available at http://wwwmmrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Zenon, "Proposal for ZeeWeed® Membrane Filtration Equipment System for the City of Westminster, Colorado, Proposal No. 479-99," Mar. 2000, entire publication.

\* cited by examiner

APPARATUS FOR POTTING MEMBRANES

This application is a divisional application under 35 U.S.C. §120, of U.S. patent application Ser. No. 10/676458 filed on Sep. 30, 2003, which was published by the USPTO in English on Apr. 28, 2005 as 20050087898, which is now U.S. Pat. No. 6,974,554, and which is a continuation of International Patent Application No. PCT/AU02/00436, filed on Apr. 4, 2002 under the Patent Cooperation Treaty (PCT), which was published by the International Bureau in English on Oct. 17, 2002, which designates the United States and claims the benefit of Australian Provisional Patent Application No. PR 4215, filed Apr. 4, 2001.

FIELD OF THE INVENTION

The present invention relates to potting methods for porous hollow fibre membranes typically used in filtration systems.

BACKGROUND OF THE INVENTION

The potting materials used to support and hold arrays of porous hollow fibre membranes are usually a compromise between materials which have sufficient rigidity to provide adequate support but sufficient softness and flexibility to avoid breakage of the fibres where they enter the pot. Too rigid a material produces rapid breakage of fibres adjacent the pot while too soft a material does not have sufficient mechanical strength to adequately support the fibres. The materials are also chosen to resist breakdown as a result of exposure to various types of feed as well as cleaning fluids used to maintain the fibres.

Known systems employ single layers of epoxy, polyurethane or silicon materials, however, each suffer from the disadvantages outlined above.

The present invention seeks to overcome or at least ameliorate one or more of the disadvantages of the prior art outlined above or at least provide a useful alternative.

SUMMARY OF THE INVENTION

According to one aspect, the present invention provides a method of forming a pot for an array of hollow fibre membranes including the steps of: placing the ends of said fibre membranes in a mould; forming a first layer of curable resin material in a non-cured state around said fibre membrane ends, applying a second layer of polyurethane resin material to said first layer prior to full curing of said first layer, said second layer of polyurethane resin material being chemically reactive with said first layer material to form an adhesive bond therebetween; at least partially curing both layers and removing the pot formed from said mould, wherein said second layer material is of higher flexibility than said first layer material when each layer is fully cured.

It will be appreciated that any known method of sealing the open fibres may be used prior to the potting process described above.

Preferably, the curable resin material is an epoxy resin. The use of an epoxy resin has been found to be advantageous when potting fibre membranes which typically contain hydroscopic liquids which may produce sealing problems between the fibres and the pot when polyurethane resin is used.

In one preferred form the layer of higher flexibility is produced by adding one or more flexibilising agents to the components of the material forming the first layer of lower flexibility.

Preferably, the method includes the step of the monitoring the curing process of the first layer to determine the optimal time in which to apply the second layer thereto. For preference, the step of monitoring includes monitoring the temperature changes within said first layer to determine the state of the curing process.

It is important that the second layer be applied to the first layer prior to curing of the first layer being completed so that there are sufficient active sites available for the chemical reaction required to adhere one layer to the other can take place. Proper adhesion of the two layers is required to prevent ingress of feed between the layers and growth of bacteria etc. between the layers leading to damage and breakage of fibres and consequential contamination of the filtrate. The use of this process also eliminates the need for special adhesives and primers to produce adhesion between the layers.

A necessary condition for the adhesion of the two layers is the chemical reaction between some of the components of the two different layers. For epoxy/polyurethane layers, it is desirable that one of the epoxy components is reactive with the isocyanate groups of the polyurethane (preferably amines or amides).

According to a second aspect, the present invention provides an apparatus for potting hollow fibre membranes including:

a mould for receiving the ends of said hollow fibre membranes;

means for forming a first layer of curable resin material in a non-cured state around said fibre membrane ends in said mould, means for applying a second layer of polyurethane resin material to said first layer prior to full curing of said first layer, said second layer polyurethane resin material being chemically reactive with said first layer material to form an adhesive bond therebetween and said second layer polyurethane resin material being of higher flexibility than said first layer material when each layer is fully cured.

Preferably, the mould includes separate means for flowing said first and second layer materials into the mould. For preference, said materials are fed into a centrifuge before being flowed along a conduit or tube into the mould. Preferably, a single centrifuge may be used having separate sections to receive the respective first and second layer materials.

Although, a centrifuge is the preferred tool used in the method, it will be appreciated that other techniques such as static potting are equally applicable to the inventive method.

BRIEF DESCRIPTION OF THE DRAWINGS

A preferred embodiment of the invention will now be described, by way of example only, with reference to the accompanying drawings in which.

DETAILED DESCRIPTION OF THE PREFERRED EMBODIMENT

Figure 1:
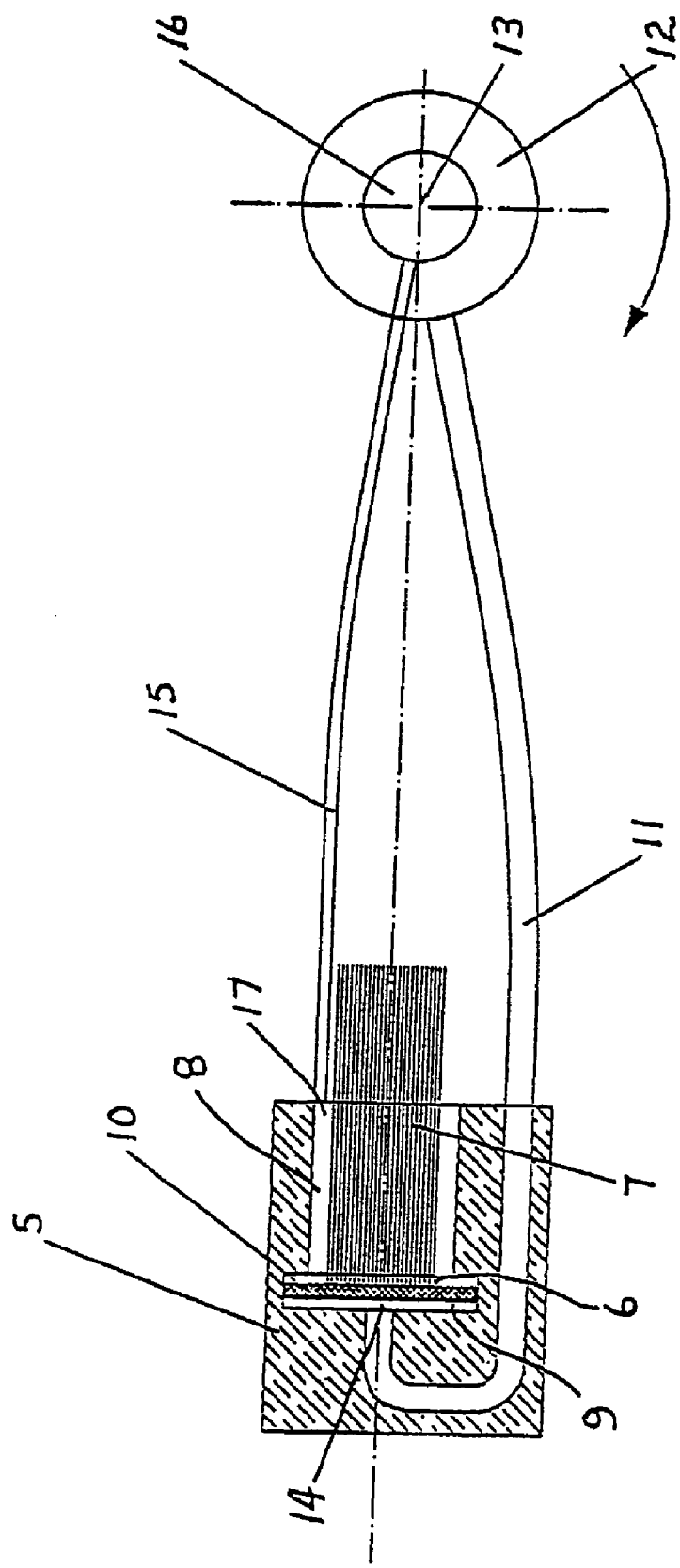
FIG. 1 shows a simplified schematic diagram of the potting apparatus used to perform the potting method in accordance with one embodiment of the present invention.

Referring to FIG. 1, the potting apparatus comprises a mould 5 for receiving the ends 6 of the fibres membranes 7. The mould 5 includes a cylindrical cavity 8 for receiving the fibre membranes 7. The cavity 8 has an enlarged-diameter base portion 9 for holding the prepot 10 which serves to support the fibres during the potting process. A tube or hose 11 connects one bowl 12 of a centrifuge 13 to the base 14 of the mould cavity 8. A second tube connects a second bowl 16 of the centrifuge 13 to the upper portion 17 of the mould cavity 8.

In use, the material for forming the first relatively hard layer of the pot is dispensed into bowl 12 of the centrifuge 13 and flowed along tube or hose 11 into the lower portion 14 of the mould cavity 8 to form a first layer around the fibre ends 6. Prior to full curing of this material, a second material for forming the second softer layer is dispensed into bowl 16 and flowed along tube or hose 15 into the mould cavity 8 to apply the second layer of material to the first layer. The layers chemically react to form an adhesive bond between the first and second layers. At an appropriate curing stage the potted fibres are removed from the mould 5.

In some applications, it may be possible to use a single bowl and tube to flow the materials sequentially into the mould to form the two layers.

In order to determine the optimal time during the curing of the first layer for applying the second layer, the temperature profile of the first layer material may be monitored, at least during the initial set up of the process. The temperature profile indicates the various stages of the curing process and when the second layer may be applied to ensure that sufficient free sites are available for chemical bonding between the two layers. Once the optimal time has been determined for a particular material combination further monitoring is unnecessary.

A steep rise in temperature indicates that the majority of the curing reaction is taking place. The optimal time for the addition of the second layer has been found to be within ±5 minutes of the time of this temperature rise and preferably, ±2 minutes.

Figure 2:
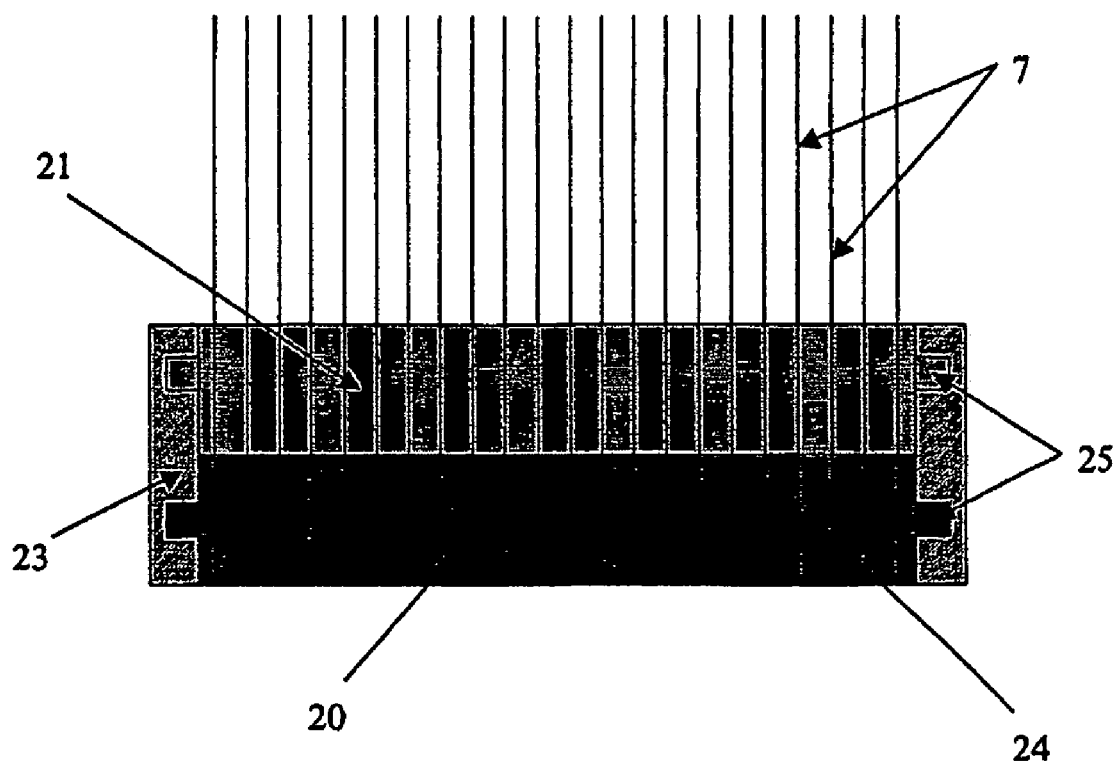
FIG. 2 shows a cross-sectional view of one potted end of the fibres illustrating one embodiment of the invention.

The embodiment shown in FIG. 2 illustrates a method using a potting sleeve 23 to enhance the interfacial binding between the potting layers 20, 21. The quantity of potting materials or the width of the potting sleeve 23 is selected to ensure that the interface 24 of the two layers is within the potting sleeve 23. The potting sleeve 23 is formed from material which ensures good adhesion between its inner surface and the two potting materials. Besides the selection of the potting sleeve material, roughening the inner surface of the sleeve 23 can also enhance the binding of the potting materials with the sleeve 23. Further enhancement can be achieved by forming grooves 25 in the potting sleeve 23. The potting sleeve may comprise at least one protrusion or indentation formed on a surface of the potting sleeve in contact with at least one of the curable resin material and the polyurethane resin material. Due to the adhesive force between the potting materials and the potting sleeve 23, it serves to reduce any movement or detachment of the two potting layers 20, 21 at the interface 24, and therefore enhances the binding of the two potting layers 20, 21.

The potting method outlined above provides a number of advantages over the prior art including improved support of the fibres serves to reduce breakages at the fibre/pot interface. In some applications it is also possible to dispense with the usual potting sleeve as the pot formed by this method has sufficient rigidity to be self-supporting. This produces a manufacturing saving as in some cases shrinkage of the potting materials relative to the potting sleeve produces gaps which are again undesirable in terms of leakage and bacterial growth. In such cases the pot must be discarded.

It will be appreciated that further embodiments and exemplifications of the invention are possible without departing from the spirit or scope of the invention described.

What is claimed is:

1. An apparatus for potting an array of hollow fibre membranes, each fibre membrane comprising an end, the apparatus comprising:
    a mould for receiving the ends of the hollow fibre membranes, the mould including a cavity having an upper portion with a first diameter and a base portion with a second diameter, the second diameter being greater than the first diameter, the base portion configured to hold a prepot supporting the ends of the membrane fibers during a potting process;
    a source of an epoxy resin material fluidly connected to the base portion of the cavity;
    a source of a polyurethane resin material fluidly connected to the upper portion of the cavity; and
    means for forming a layer of the epoxy resin material around the membrane ends in the mould.

2. The apparatus according to claim 1, wherein the mould comprises separate means for flowing the epoxy resin material and the polyurethane resin material into the mould.

3. The apparatus according to claim 1, wherein the apparatus comprises a centrifuge, wherein at least one of the epoxy resin material and the polyurethane resin material is fed into the centrifuge before being flowed into the mould.

4. The apparatus according to claim 3, wherein the centrifuge comprises separate sections for receiving the epoxy resin material and the polyurethane resin material.

5. The apparatus according to claim 1, further comprising a potting sleeve within the mould to receive the resin layers.

6. The apparatus according to claim 5, wherein the potting sleeve comprises adhesion means, wherein the adhesion means assist in adhesion of at least one of the epoxy resin material and the polyurethane resin material to the potting sleeve.

7. The apparatus according to claim 5, wherein a surface of the potting sleeve in contact with at least one of the epoxy resin material and the polyurethane resin material is roughened.

8. The apparatus according to claim 5, wherein the potting sleeve comprises at least one protrusion formed on a surface of the potting sleeve in contact with at least one of the epoxy resin material and the polyurethane resin material.

9. The apparatus according to claim 5, wherein the potting sleeve comprises at least one indentation formed on a surface of the potting sleeve in contact with at least one of the epoxy resin material and the polyurethane resin material.

10. The apparatus of claim 1, wherein the polyurethane resin material is of a higher flexibility than the epoxy resin material when each is fully cured.

11. The apparatus of claim 1, further comprising a source of a flexibilizing agent.

12. The apparatus of claim 1, further comprising a temperature profile monitor configured to determine an optimal time to apply a layer of the polyurethane resin material prior to full curing of the epoxy resin material.

* * * * *